US012591214B2

(12) United States Patent
Chen et al.

(10) Patent No.: US 12,591,214 B2
(45) Date of Patent: Mar. 31, 2026

(54) CUTTING MONITORING SYSTEM AND MONITORING METHOD THEREOF

(71) Applicant: INDUSTRIAL TECHNOLOGY RESEARCH INSTITUTE, Hsinchu (TW)

(72) Inventors: Yi-Ming Chen, Taichung City (TW); Shu-Chung Liao, Taichung City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 530 days.

(21) Appl. No.: 17/975,418

(22) Filed: Oct. 27, 2022

(65) Prior Publication Data
US 2024/0019838 A1      Jan. 18, 2024

(30) Foreign Application Priority Data
Jul. 12, 2022      (TW) .................................. 111126086

(51) Int. Cl.
*G05B 19/4065*          (2006.01)

(52) U.S. Cl.
CPC .................... *G05B 19/4065* (2013.01); *G05B 2219/37336* (2013.01); *G05B 2219/50185* (2013.01)

(58) Field of Classification Search
CPC ...... G05B 19/4065; G05B 2219/37336; G05B 2219/50185; G05B 2219/37252;
(Continued)

(56) References Cited

U.S. PATENT DOCUMENTS

| | | | |
|---|---|---|---|
| 2003/0182014 A1 * | 9/2003 | McDonnell | ........ G05B 19/4065 |
| | | | 700/159 |
| 2012/0240386 A1 * | 9/2012 | Cantelli | ................... B23H 9/00 |
| | | | 29/33 R |

(Continued)

FOREIGN PATENT DOCUMENTS

| | | | |
|---|---|---|---|
| CN | 103465107 A | * 12/2013 | ......... B23Q 17/0971 |
| CN | 105196114 B | 8/2016 | |

(Continued)

OTHER PUBLICATIONS

Colak et al., "Cutting Forces and 3D Surface Analysis of CFRP Milling with PCD Cutting Tools", Procedia CIRP 45, 2016, pp. 75-78.

(Continued)

*Primary Examiner* — Kamini S Shah
*Assistant Examiner* — Mohammed Shafayet
(74) *Attorney, Agent, or Firm* — Birch, Stewart, Kolasch & Birch, LLP

(57)          ABSTRACT
A cutting monitoring system used for a machine is provided. The cutting monitoring system includes a data capturing module, a database and a cutting control module. The data capturing module is configured to capture a motor current data of the machine and a tool wear data. The motor current data is used as a training data for a tool wear state prediction model to perform deep learning and forecasting. The database is configured to establish a tool wear database for the comparison of a tool wear state. The tool wear state prediction model outputs a tool wear state prediction data to the cutting control module. The cutting control module judges whether the tool wear state is normal according to the tool wear state prediction data.

4 Claims, 11 Drawing Sheets

(58) Field of Classification Search
CPC .......... G05B 2219/37256; G05B 2219/37258;
B23Q 17/0957; B23Q 15/16
See application file for complete search history.

(56) References Cited

U.S. PATENT DOCUMENTS

| | | | | |
|---|---|---|---|---|
| 2016/0170401 A1* | 6/2016 | Mori | ........................ | B23B 41/04 700/187 |
| 2018/0272491 A1* | 9/2018 | Yang | .................. | B23Q 17/0971 |
| 2019/0143467 A1* | 5/2019 | Wang | .................. | G05B 19/4065 700/175 |
| 2019/0145183 A1* | 5/2019 | Potash | .................... | E21B 10/00 700/175 |
| 2020/0166905 A1* | 5/2020 | Karandikar | ........ | G05B 19/4065 |

FOREIGN PATENT DOCUMENTS

| | | | | |
|---|---|---|---|---|
| CN | 107932188 | A | | 4/2018 |
| CN | 108873813 | A | | 11/2018 |
| CN | 109799784 | A | | 5/2019 |
| CN | 110193755 | A | | 9/2019 |
| CN | 113313198 | A | | 8/2021 |
| CN | 113894617 | A * | 1/2022 | ......... B23Q 17/0971 |
| CN | 114227381 | A | | 3/2022 |
| JP | 2021-53772 | A | | 4/2021 |
| TW | 201923495 | A | | 6/2019 |
| TW | M583566 | U | | 9/2019 |
| WO | WO 2014/056582 | A1 | | 4/2014 |
| WO | WO 2015/016223 | A1 | | 2/2015 |

OTHER PUBLICATIONS

Kuo et al., "The effects of cutting conditions and tool geometry on mechanics, tool wear and machined surface integrity when routing CFRP composites", Journal of Manufacturing Processes 64, 2021, pp. 113-129.

Uhlmann et al., "High Speed Cutting of carbon fibre reinforced plastics", Procedia Manufacturing, Jun. 2016, pp. 113-123.

Taiwanese Office Action and Search Report for Taiwanese Application No. 111126086, dated Mar. 29, 2023.

\* cited by examiner

| Test No. | Tool type | Cutting speed (m/min) | Feeding speed (mm/min) | Cutting depth (mm) |
|---|---|---|---|---|
| 1 | First tool | 120 | 0.025 | 0.25 |
| 2 | First tool | 120 | 0.04 | 0.25 |
| 3 | First tool | 120 | 0.055 | 0.25 |
| 4 | First tool | 120 | 0.025 | 0.5 |
| 5 | First tool | 120 | 0.04 | 0.5 |
| 6 | First tool | 120 | 0.055 | 0.5 |
| 7 | First tool | 250 | 0.025 | 0.25 |
| 8 | First tool | 250 | 0.04 | 0.25 |
| 9 | First tool | 250 | 0.055 | 0.25 |
| 10 | First tool | 250 | 0.025 | 0.5 |
| 11 | First tool | 250 | 0.04 | 0.5 |
| 12 | First tool | 250 | 0.055 | 0.5 |
| 13 | Second tool | 120 | 0.025 | 0.25 |
| 14 | Second tool | 120 | 0.04 | 0.25 |
| 15 | Second tool | 120 | 0.055 | 0.25 |
| 16 | Second tool | 120 | 0.025 | 0.5 |
| 17 | Second tool | 120 | 0.04 | 0.5 |
| 18 | Second tool | 120 | 0.055 | 0.5 |
| 19 | Second tool | 250 | 0.025 | 0.25 |
| 20 | Second tool | 250 | 0.04 | 0.25 |
| 21 | Second tool | 250 | 0.055 | 0.25 |
| 22 | Second tool | 250 | 0.025 | 0.5 |
| 23 | Second tool | 250 | 0.04 | 0.5 |
| 24 | Second tool | 250 | 0.055 | 0.5 |

FIG. 2

| Test No. | Tool type | Cutting speed (m/min) | Feeding rate (mm/rev) |
|---|---|---|---|
| 1 | First tool | 120 | 0.4 |
| 2 | First tool | 120 | 0.52 |
| 3 | First tool | 93.75 | 0.4 |
| 4 | First tool | 93.75 | 0.52 |
| 5 | Second tool | 120 | 0.4 |
| 6 | Second tool | 120 | 0.52 |
| 7 | Second tool | 93.75 | 0.4 |
| 8 | Second tool | 93.75 | 0.52 |
| 9 | Third tool | 120 | 0.4 |
| 10 | Third tool | 120 | 0.52 |
| 11 | Third tool | 93.75 | 0.4 |
| 12 | Third tool | 93.75 | 0.52 |

108

| | |
|---|---|
| Selected machine: | Wheel Rim Special Machine by Yeong Chin Machinery ▼ |
| Rotation speed of the spindle: | 5000 |
| Feeding speed: | 2000 |
| Slow down feeding: | 500 |
| Diameter of the tool: | 10 |
| Tool number: | 5 |
| Cutting liquid: | ☐ On/Off of the cutting liquid |
| Number of blades: | 3 |
| Spiral angle of the tool: | 30 |
| Width/length of workpiece: | 50 |
| Initial Y/X values: | 220 |
| Cutting depth: | 2.9 |
| Step distance: | 10 |
| Increment in cutting depth: | 0.1 |
| Load of the spindle: | 5 |
| Composition of cutting forces: | 100 |

Start

FIG. 7

Deep machine learning model for tool wear

Input

Output

First layer

Second layer

Third layer

CUTTING MONITORING SYSTEM AND MONITORING METHOD THEREOF

This application claims the benefit of Taiwan application Serial No. 111126086, filed Jul. 12, 2022, the disclosure of which is incorporated by reference herein in its entirety.

TECHNICAL FIELD

The disclosure relates in general to a cutting system, and more particularly to a composite tool cutting monitoring system and a monitoring method thereof.

BACKGROUND

When a tool is used for cutting, the temperature of the tool may easily soar up and make the cutting overheated. Therefore, how to monitor the tool cutting state and maintain a stable tool state is necessary for the realization of high-efficiency and automated cutting. However, high-efficiency cutting cannot solely rely on the increase in rotation speed. Instead, parameters need to be adjusted according to the tool state (such as severe wear or normal wear) to avoid tool lifespan being reduced and affecting the operation of the machine. Currently, research on tool lifespan mainly focuses on the development in the material of the tool, the improvement in the geometric shape of the tool or the improvement in the cutting force of the tool, and the machining optimization of the tool and the improvement in cutting monitoring are left untouched.

SUMMARY

The present disclosure relates to a cutting monitoring system and a monitoring method thereof. The relationship between tool state and motor current is forecasted through machine learning. The trained prediction model can provide an optimal parameter with which the cutting control module can optimize the tool wear state to achieve smart cutting monitoring.

According to one embodiment, a cutting monitoring system used for a machine is provided. The cutting monitoring system includes a data capturing module, a database and a cutting control module. The data capturing module is configured to capture a motor current data of the machine and a tool wear data. The motor current data is used as a training data for a tool wear state prediction model to perform deep learning and forecasting. The database is configured to establish a tool wear database for the comparison of a tool wear state. The tool wear state prediction model outputs a tool wear state prediction data to the cutting control module. The cutting control module judges whether the tool wear state is normal according to the tool wear state prediction data.

According to another embodiment, a cutting monitoring method is used for a machine is provided. The cutting monitoring method includes the following steps. A motor current data of a machine is captured, and a tool wear data is measured. The motor current data is used as a training data for a tool wear state prediction model to perform deep learning and forecasting. A tool wear database is established for the comparison of a tool wear state. A tool wear state prediction data generated by the tool wear state prediction model is outputted to a cutting control module. Whether the tool wear state is normal is judged by the cutting control module according to the tool wear state prediction data.

The above and other aspects of the disclosure will become better understood with regard to the following detailed description of the preferred but non-limiting embodiment (s). The following description is made with reference to the accompanying drawings.

BRIEF DESCRIPTION OF THE DRAWINGS

FIG. 2 is a list of tool state data.

FIG. 7 is a schematic diagram of an optimization management platform of machining parameter.

Figure 1:
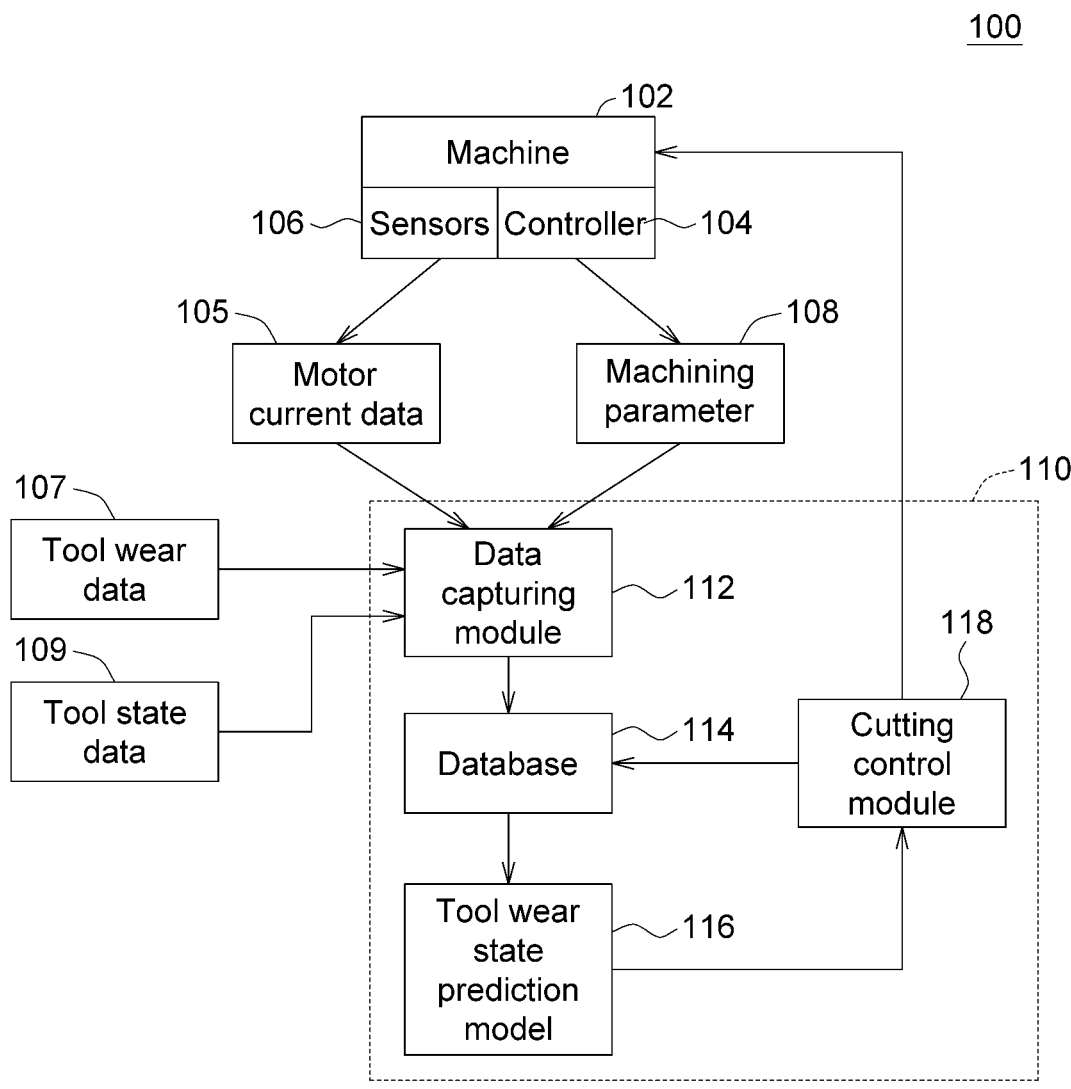
FIG. 1 is a schematic diagram of a smart machining system using tool cutting monitoring according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical solutions for the embodiments of the present application are clearly and thoroughly disclosed with accompanying drawings. Obviously, the embodiments disclosed below are only some rather than all of the embodiments of the present application. Similar/identical designations are used to indicate similar/identical elements.

Refer to FIG. 1. FIG. 1 is a schematic diagram of a smart machining system 100 using tool cutting monitoring according to an embodiment of the present disclosure.

The smart machining system 100 includes a machine 102, a controller 104, several sensors 106 and a cutting monitoring system 110. The machine 102 can be an industrial automation equipment, such as a lathe, a CNC machine tool, or a robot arm, and is provided with a spindle motor and a tool. The spindle motor is configured to enable tool rotation, tool feed or tool cutting. The current of the spindle motor can be provided by a controller 104 or an external power source. Furthermore, motor machining parameters such as current, rotation speed and feed amount can be obtained through the detection of the sensors 106. Besides, the controller 104 can precisely control the rotation speed and feed amount of the spindle motor through computer numerical control; then, the spindle motor can precisely control tool rotation, tool feed or tool cutting to reach precision control. Additionally, the controller 104 can set the machining parameter 108, such as rotation speed or feed amount, of the spindle motor or the tool which can be used as a reference of subsequent adjustment of the machining parameter 108.

In the present embodiment, in order to achieve high-efficiency and automated cutting, the cutting monitoring system 110 can monitor the tool cutting state to assure that a stable tool state is maintained. As indicated in FIG. 1, the cutting monitoring system 110 includes a data capturing module 112, a database 114, a tool wear state prediction model 116 and a cutting control module 118. The data capturing module 112 is configured to capture a motor current data 105 of the machine 102 and measure a tool wear data 107. For instance, the data capturing module 112, including a PCB and an input/output interface, can exchange data within the machine 102 or between machines through the Open Platform Communications unified architecture (OPC UA) communications protocol to collect information such as motor current data 105, tool wear data 107 and tool state data 109. The OPC UA is an open platform protocol that supports multithreading but does not specify operating system or programming languages, and therefore is suitable for information integration in industrial automation equipment. The cutting monitoring system 110 may be a computer.

In an embodiment, the tool wear data 107 is measured for the calculation of surface roughness of the tool. For instance, material metallographic structure and tool wear state are observed using a high magnification optical microscope. Different tools have different machining conditions and wear states. For instance, tool type includes straight knife and spiral knife; tool machining conditions may include parameters such as tool cutting speed, tool feeding depth, and tool cutting depth; tool wear state can be divided into initial wear, normal wear and rapid wear. Generally speaking, the period from the start of cutting (initial wear) to a predetermined cutting time is referred as tool lifespan. Tool lifespan is normally quantified when tool wear extent is within a normal wear range, and the tool wear outside the normal wear range is referred as rapid wear. Also, a particular incidence can be used as a basis for judging whether rapid wear occurs. Examples of the particular incidence include vibration intensification, deterioration of machined surface roughness, poor chip breaking and chipped edge. When a tool reaches its tool lifespan, the head part of the tool becomes blunt and wears due to the continuously received large force, high temperature and violent friction. When wear reaches a certain degree, the tool cannot maintain its original cutting quality, and cannot be used anymore. Thus, when using a tool, the tool should be prevented from entering a rapid wear stage.

Generally speaking, when a is used for cutting, the temperature of the may easily soar up and make the cutting overheated. Therefore, the tool cutting state needs to be well monitored to assure that the tool cutting state remains within a normal wear range. Once the tool enters a rapid wear stage, tool machining conditions (parameters such as tool cutting speed, tool feeding depth and tool cutting depth) must be changed, so that tool wear can be reduced, and tool lifespan can be prolonged.

Besides, although the increase in tool cutting speed can reduce the workpiece machining time and increase the precision on the machining surface, tool wear rate will increase, that is, tool lifespan will be reduced. The relationship between tool cutting speed and tool lifespan is a fixed value. That is, the faster the tool cutting speed, the shorter the tool lifespan; conversely, the slower the tool cutting speed, the longer the tool lifespan. Thus, the cutting control module 118 of the present system 110 can increase tool lifespan by reducing tool cutting speed or changing parameter such as tool feeding depth or tool cutting depth. The data capturing module 112 and the cutting control module 118 may be a program or a circuit for cutting monitoring system 110.

Although the increase in tool cutting speed can optimize surface roughness of a tool and increase machining quality of a workpiece, the increase in tool cutting speed will lead to a reduced tool lifespan. Moreover, poor tool state may easily make cutting overheated; meanwhile, when the tool state is poor (such as in a rapid wear stage) but the machining parameter 108 cannot be adjusted immediately, tool lifespan will be reduced. In the present embodiment, the cutting monitoring system 110 can perform machine learning and forecast through the relationship between tool wear state and motor current; the trained prediction model 116 can provide an optimal parameter with which the cutting control module 118 can optimize tool wear state to increase tool lifespan.

Figure 3A:
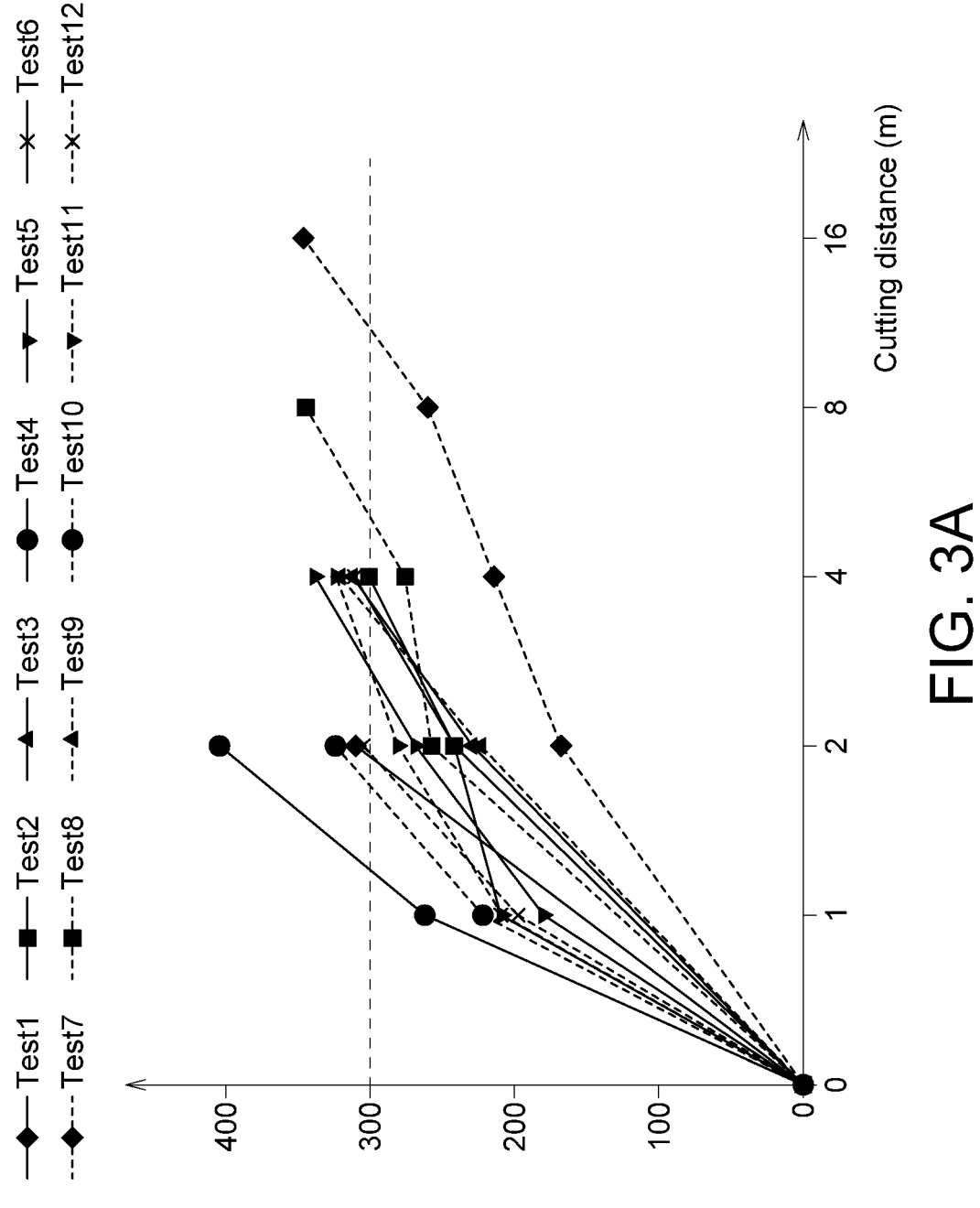
FIG. 3A and FIG. 3B respectively are diagrams of experimental data of a tool wear database.
Figure 3B:
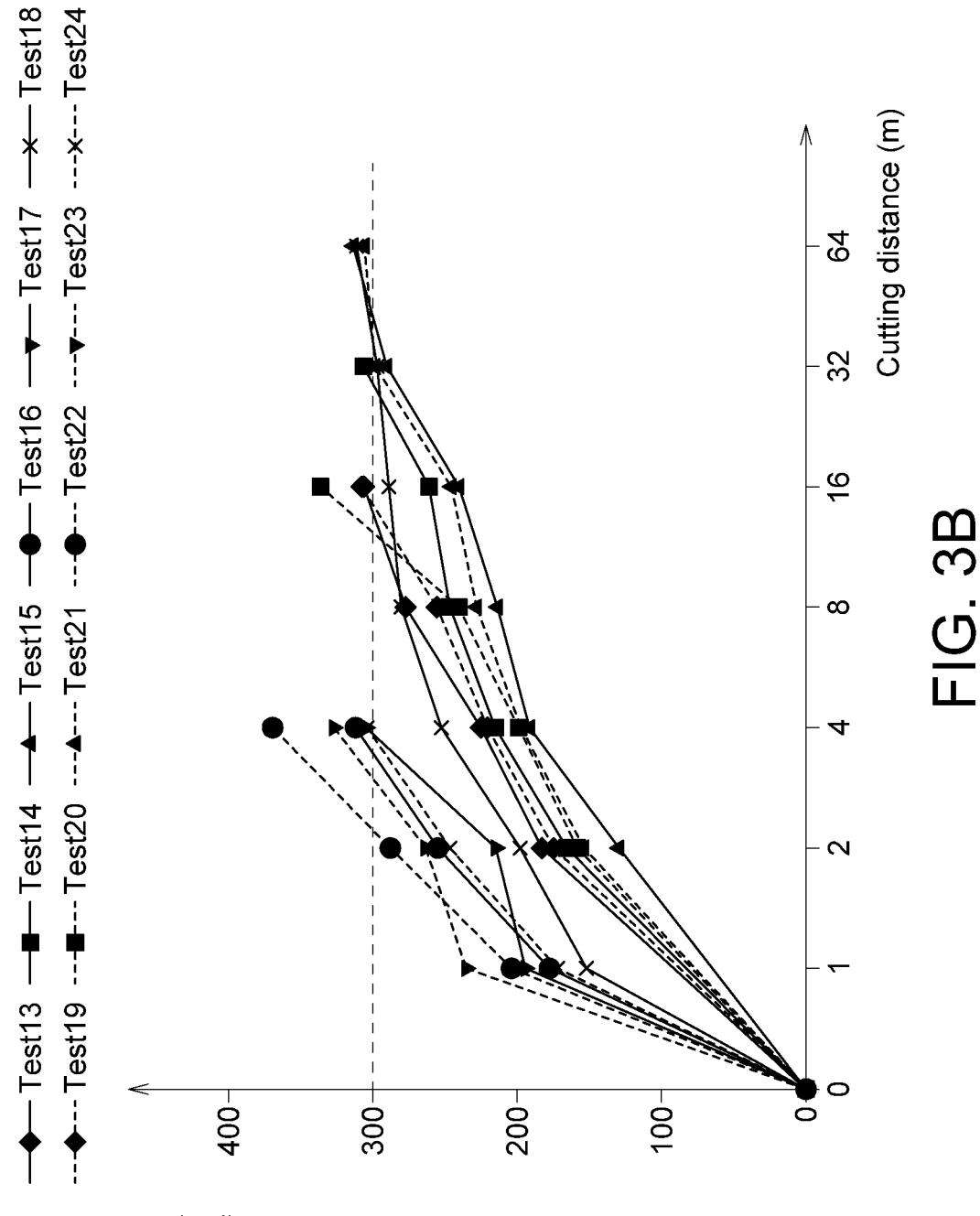
Figures 4, 5:
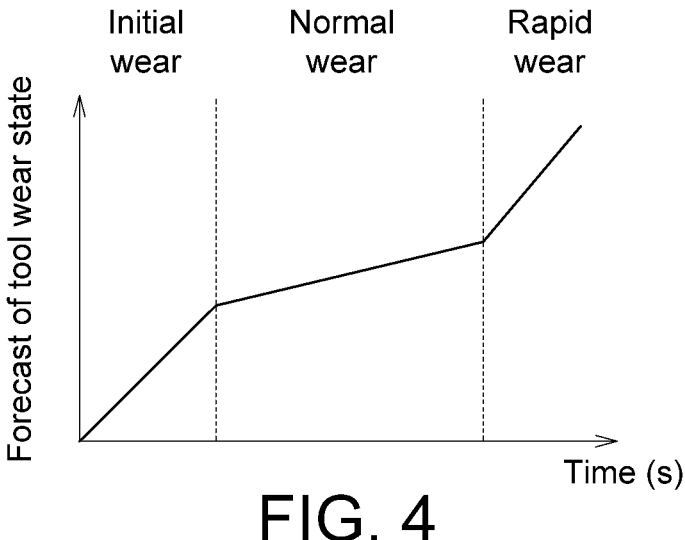
FIG. 4 is a diagram of tool wear state.
FIG. 5 is a list of experimental data obtained from different tool state data and used for variance analysis.

Refer to FIG. 2 to FIG. 4. FIG. 2 is a list of tool state data 109. FIG. 3A and FIG. 3B are diagrams of experimental data of a tool wear database 107. FIG. 4 is a diagram of tool wear state. Detailed steps of the parameter optimization process are as follows. Firstly, the process begins at step 1, a tool state data 109 is obtained (as indicated in FIG. 2, the tool state data includes information such as tool types and tool machining conditions). Next, the process proceeds to step 2, an optimized parameter is located from the tool wear database 107 through comparison (the data base can be established according to the experimental data of FIG. 3A and FIG. 3B). Then, the process proceeds to step 3, the cutting control module 118 and the machine 102 are linked, and the optimized parameter is transmitted to the controller 104 of to the machine 102 for the adjustment of the machining parameter 108. The cutting control module 118 can include a PCB and a processor for cutting tool.

In step 2 of the parameter optimization process, a machining parameter suitable for adjusting tool wear 108 is located from the database 114 through variance analysis (the machining parameter is such as tool cutting speed, tool feeding depth or tool cutting depth). In variance analysis, the contribution index of a control factor represents a ratio of the variance of the control factor to total variance. The contribution index of a control factor can be interpreted as the influence caused by the variation of the control factor. For instance, if the influence on tool wear caused by tool cutting speed is greater than that caused by another control factor, the contribution index of tool cutting speed is greater than the contribution index of the another control factor.

The contribution index is an F value of F-distribution and is estimated according to the mean of square within the group and between groups calculated according to the sum of square and degrees of freedom of the experimental data. The denominator of F value represents the variance estimated from the original experimental data; the numerator represents the variance estimated from sample average of the original experimental data. The denominator and the numerator of F value are two variances of the same sample space estimated using two different methods. When F value is large, this indicates that the control factor is an influential parameter. Thus, F value can be used as a contribution index in parameter optimization.

Figure 6:
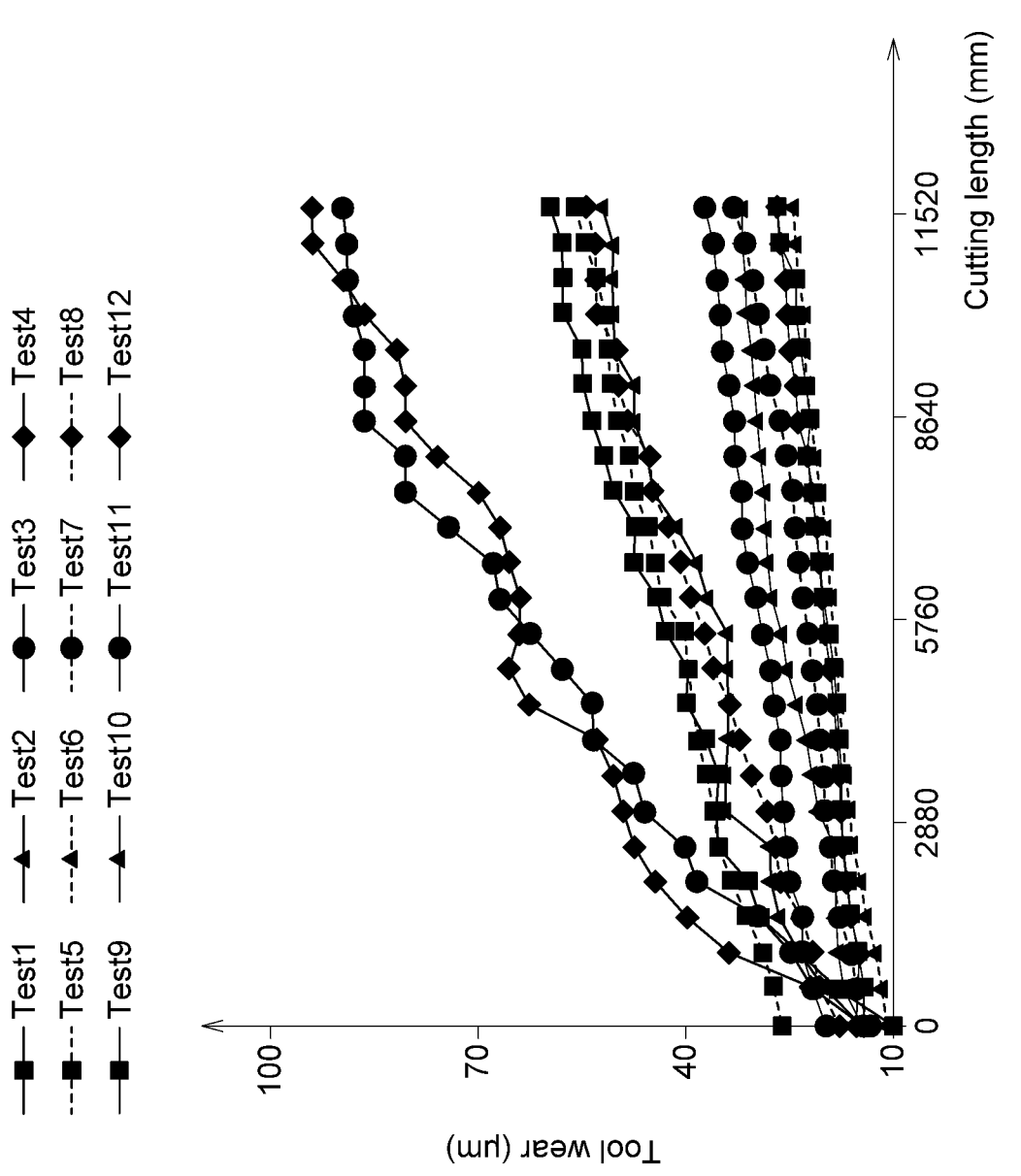
FIG. 6 is a relation diagram of tool wear vs. cutting length.

Refer to FIGS. 5 and 6. FIG. 5 is a list of experimental data obtained from different tool state data 109 and used for variance analysis. FIG. 6 is a relation diagram of tool wear vs. cutting length. It can be known from FIG. 6, when tool cutting speed drops from 120 m/min to 93.75 m/min, under the machining conditions that feeding rate remains the same (such as 0.4 or 0.52 mm/rev) and cutting length increases or tool wear reduces, the influence on tool wear caused by the variation of the tool cutting speed is greater than that caused by other control factors. That is, tool cutting speed has a larger degree of contribution to tool wear. In test 1 and test 2, under the machining conditions that tool cutting speed remains fixed (such as 120 m/min) and tool feeding rate increases from 0.4 mm/rev to 0.52 mm/rev, tool wear will increase along with the increase in cutting length. In test 3 and test 4, under the machining conditions that tool cutting speed remains fixed (such as 93.75 m/min) and tool feeding rate increases from 0.4 mm/rev to 0.52 mm/rev, tool wear will increase along with the increase in cutting length. Relative to test 1 and test 2, the influence on tool wear caused by the variation of tool feeding rate is insignificant, that is, the tool feeding rate has small contribution to tool wear.

Refer to FIG. 7. FIG. 7 is a schematic diagram of an optimization management platform of machining parameter 108. The cutting control module 118 and the machine 102 are linked, and the optimized tool cutting parameter is transmitted to the controller 104 for the adjustment of the machining parameter 108. After obtaining the optimized tool cutting parameter, the controller 104 can adjust the current machining parameter 108 of the machine 102, such as spindle rotation speed, feeding speed, tool type, and tool machining condition. Detailed descriptions can be obtained with reference to FIG. 7, and are not repeated here. The optimization management platform of the machining parameter 108 can be remote controlled and the optimized machining parameter 108 can be inputted to the management platform.

Figure 8:
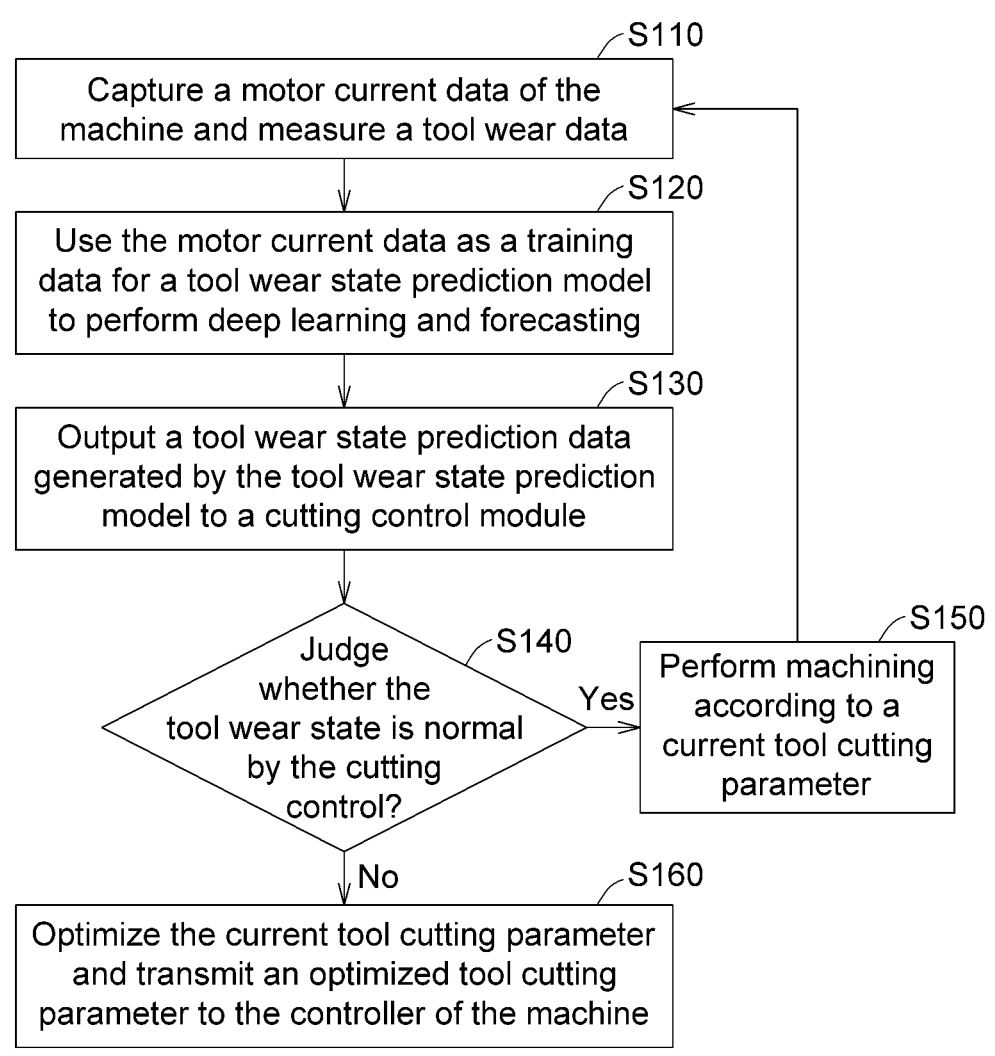
FIG. 8 is a flowchart of a cutting monitoring method according to an embodiment of the present disclosure.

Refer to FIG. 8. FIG. 8 is a flowchart of a cutting monitoring method according to an embodiment of the present disclosure. In the present embodiment, the cutting monitoring system 110 of FIG. 1 performs a cutting monitoring method as follows. In step S110, a motor current data 105 of the machine 102 is captured and a tool wear data 107 is measured. In step S120, the motor current data 105 and the tool wear data 107 are used as a training data of a tool wear state prediction model 116 for deep learning and forecast. The trained prediction model 116 can be stored in an application software for the machine 102 to use. In step S130, a tool wear state prediction data generated by the tool wear state prediction model 116 is outputted to a cutting control module 118, wherein the tool wear state can be divided into initial wear, normal wear, and rapid wear. In step S140, whether the tool wear state is normal is judged by the cutting control module 118 (for example, whether the machining parameter 108 needs to be optimized). If the tool wear state is within a normal wear range, the method proceeds to step S150, the machine 102 is controlled by the cutting control module 118 and is machined according to the current tool cutting parameter (without optimization). If the tool wear state is within a rapid wear range, the method proceeds to step S160, the current tool cutting parameter of the machine 102 is optimized by the cutting control module 118 and the optimized tool cutting parameter is transmitted to the controller 104 of the machine 102.

The tool wear state prediction model 116 can be a long short term memory network (LSTM) prediction model. In the present system 110, the tool wear state prediction model 116 performs machine learning and forecast of the tool wear state with the captured motor current data 105. Since the motor current data 105 has time sequence and continuity and the recurrent neural network (RNN) is an algorithm with time memory function for resolving time sequence problems, the present system 110 can use the LSTM prediction model as a recurrent neural network and establish an architecture of connection between each input data and output data. The input data is such as the motor current data 105 and the tool wear data 107; the output data is such as the tool wear state. The present system uses the root mean square (RMS) of the motor current data 105 as a training data, and inputs the training data to the LSTM prediction model 116 to increase prediction accuracy.

Figure 9A:
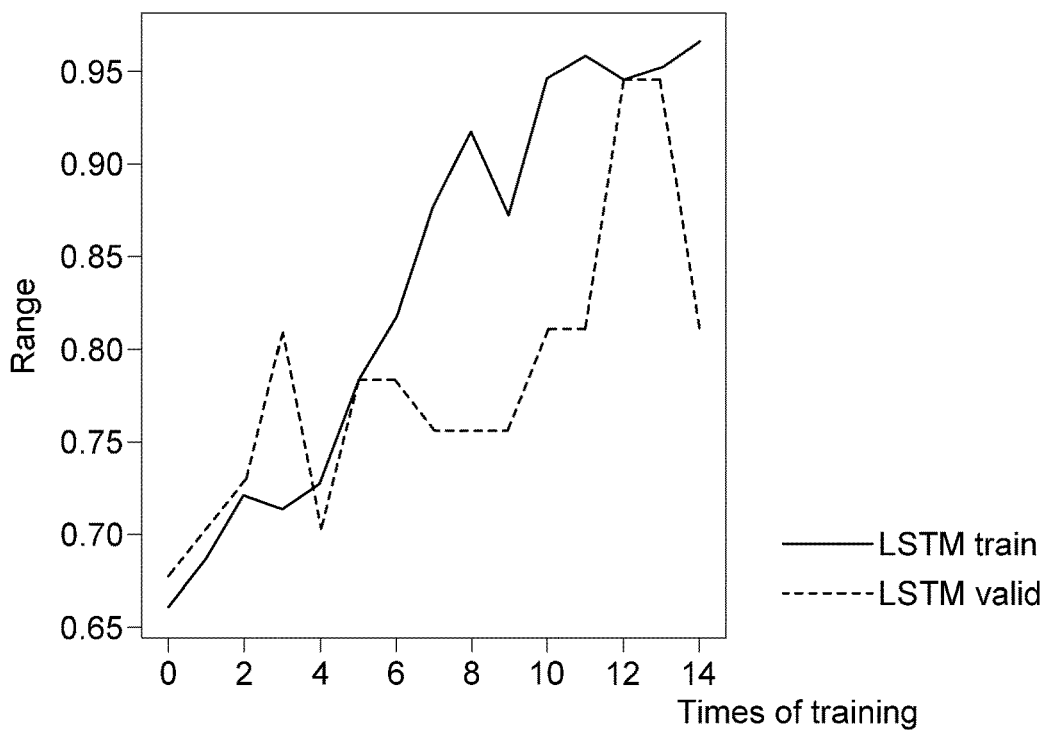
FIGS. 9A and 9B are schematic diagrams of prediction model training.
Figure 9B:
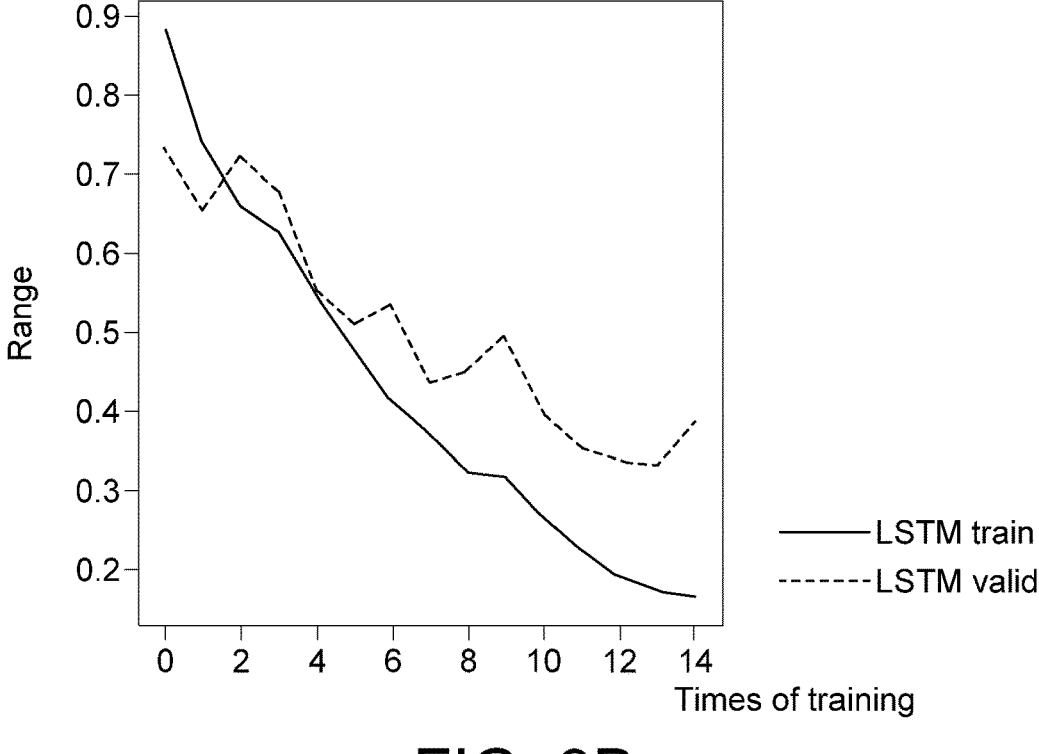

Referring to FIGS. 9A and 9B, schematic diagrams of prediction model training are shown. As indicated in FIG. 9A and FIG. 9B, if the captured motor current data 105 is normalized, the training and forecasting effects of the LSTM model are greatly improved, so that the prediction precision can be increased. Conversely, if the captured motor current data 105 is not normalized, the training and forecasting effects of the LSTM model are poor, and the prediction precision cannot be increased. In the diagrams, the LSTM train line is for training accuracy; the LSTM valid line is for verifying accuracy using trained data. When verification accuracy is close to training accuracy, this indicates that the training process is excellent.

Also, to resolve the overfitting problem of the LSTM model, the present system adds a dropout parameter to the recurrent neural network. Dropout means: at each time of training, a portion of neurons are neglected at random, that is, during forward transmission, the influence of a neuron on the activation of the downstream is neglected, and the weight is not updated during backward transmission. The neighbor of each neuron will depend on the characteristics composed of the neighbor's behavior, and overfitting will occur if there is overdependence. If each time a portion of neurons are taken away from the network at random, the remaining neurons must make up the function of the missing neuron, so that the entire network becomes a collection of many independent networks (different solutions for the same problem). The effect of dropout is that the network becomes more insensitive to the change in the weight of a particular, the generalization ability of the network is increased, and overfitting is reduced.

Figure 9C:
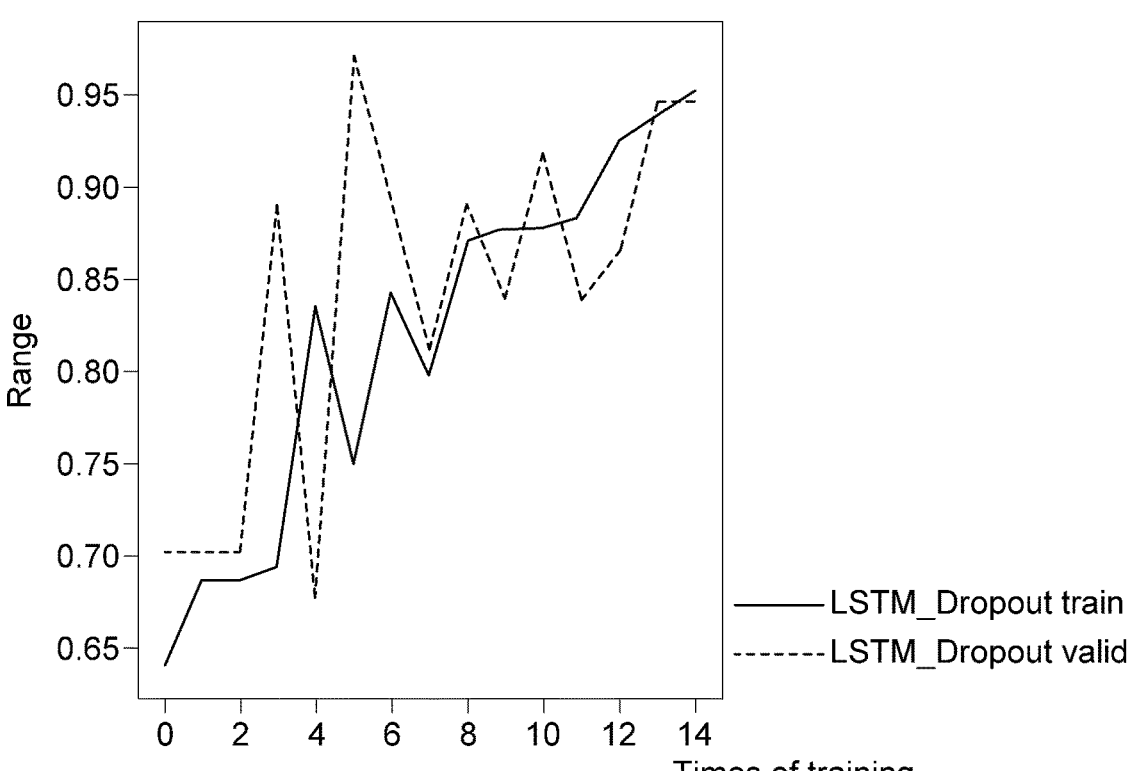
FIGS. 9C and 9D are schematic diagrams of prediction model training.
Figure 9D:
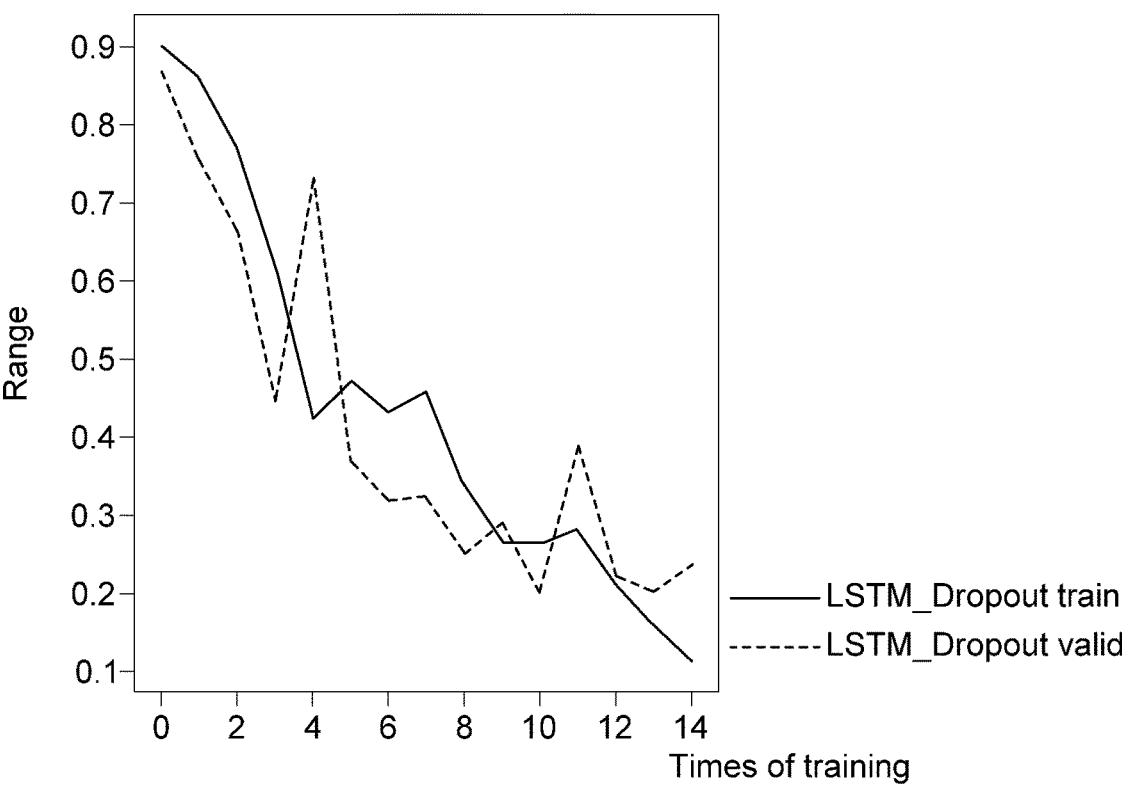

Referring to FIGS. 9C and 9D, schematic diagrams of prediction model training are shown. In FIG. 9C and FIG. 9D, the present system adds a Dropout parameter to the LSTM model to prevent overfitting, so that the training and forecasting effects of the LSTM model can be improved and the prediction precision can be increased. As indicated in the diagrams, the LSTM_Dropout train line is for training accuracy; the LSTM_Dropout valid line is for verifying accuracy using trained data. When verification accuracy is close to training accuracy, this indicates that the training process is excellent.

Figure 10:
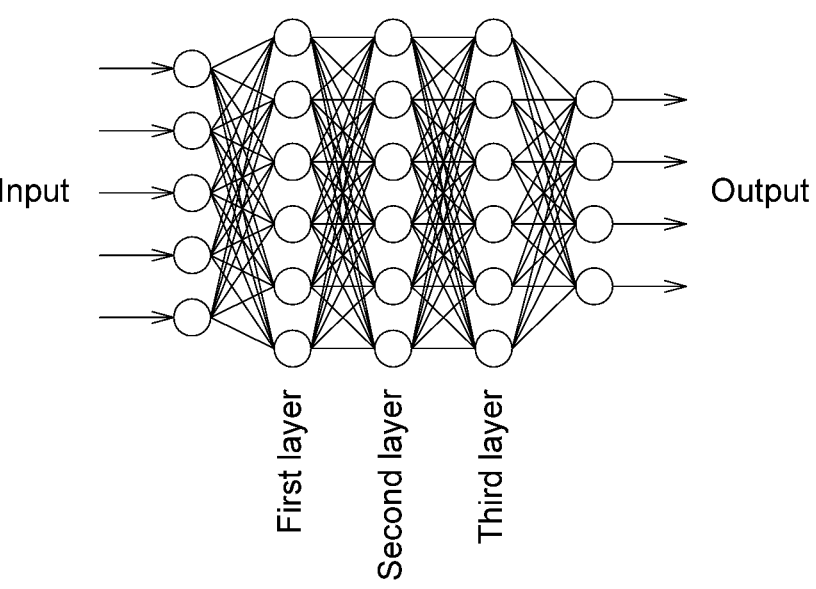
FIG. 10 is a schematic diagram of a deep machine learning model for tool wear.

During the training of prediction model, the motor current data at different time points can be inputted to the prediction model 116, and each set of motor current data 105 is a set of time series data. For instance, there are 24 or even more sets of motor current data 105 used as training data. After deep machine learning, a corresponding tool wear state (level) can be obtained. Examples of the tool wear state include initial wear (level 0), normal wear (level 1) and rapid wear (level 2). Referring to FIG. 10, a schematic diagram of a deep machine learning model for tool wear is shown. The input data is such as motor current data 105; the first layer training model is such as LSTM; the first layer training model is such as dropout model; the third layer training model is such as LSTM; the last outputted layer is such as tool wear state (level).

According to the tool cutting monitoring system and the monitoring method thereof disclosed in above embodiments of the disclosure, the present system can forecast the relationship between tool state and motor current through machine learning. The trained prediction model can provide an optimal parameter with which the cutting control module can optimize the tool wear state to achieve smart cutting monitoring.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A cutting monitoring system used for a machine, wherein the cutting monitoring system comprises:
    a data capturing module having a circuit board and an input/output interface and configured to capture a motor current data of the machine and a tool wear data, wherein a root mean square (RMS) of the motor current data is used as a training data for a tool wear state prediction model to perform deep learning and forecasting;
    a database configured to establish a tool wear database for comparison of a tool wear state; and
    a cutting control module having another circuit board and a processor, wherein the tool wear state prediction model outputs a tool wear state prediction data to the cutting control module, and the cutting control module judges whether a tool wear is normal according to the tool wear state prediction data,
    wherein the tool wear state comprises initial wear, normal wear and rapid wear, when the tool wear is within a rapid wear range according to the tool wear state prediction data, the cutting control module performs a parameter optimization and a variance analysis to optimize a current tool cutting parameter,
    wherein the parameter optimization comprises obtaining a tool state data, comparing the tool state data with the tool wear database to locate an optimized tool cutting parameter, and transmitting the optimized tool cutting parameter to the machine,
    wherein in the variance analysis, contribution index represents a ratio of variance of a control factor to total variance, and the control factor with a largest degree of contribution to the tool wear is located and used as the contribution index of the optimized tool cutting parameter for adjusting the current tool cutting parameter when the tool wear is within the rapid wear range according to the tool wear state prediction data.

2. The cutting monitoring system according to claim 1, wherein when the tool wear is within a normal wear range, the cutting control module controls the machine to perform machining according to the current tool cutting parameter.

3. A cutting monitoring method used for a machine, wherein the cutting monitoring method comprises:
    capturing a motor current data of the machine and measuring a tool wear data;
    using a root mean square (RMS) of the motor current data as a training data for a tool wear state prediction model to perform deep learning and forecasting;
    establishing a tool wear database for comparison of a tool wear state;
    outputting a tool wear state prediction data generated by the tool wear state prediction model to a cutting control module; and
    judging whether a tool wear is normal by the cutting control module according to the tool wear state prediction data,
    wherein the tool wear state comprises initial wear, normal wear and rapid wear, when the tool wear is within a rapid wear range according to the tool wear state prediction data, the cutting control module performs a parameter optimization and a variance analysis to optimize a current tool cutting parameter,
    wherein parameter optimization comprises obtaining a tool state data, comparing the tool state data with the tool wear database to locate an optimized tool cutting parameter, and transmitting the optimized tool cutting parameter to the machine,
    wherein in the variance analysis, contribution index represents a ratio of variance of a control factor to total variance, and the control factor with a largest degree of contribution to the tool wear is located and used as the contribution index of the optimized tool cutting parameter for adjusting the current tool cutting parameter when the tool wear is within the rapid wear range according to the tool wear state prediction data.

4. The cutting monitoring method according to claim 3, wherein when the tool wear is within a normal wear range, the cutting control module controls the machine to perform machining according to the current tool cutting parameter.

\* \* \* \* \*